Nov. 18, 1952     W. M. ANDERSON     2,618,016
VULCANIZING PATCH
Filed April 9, 1949
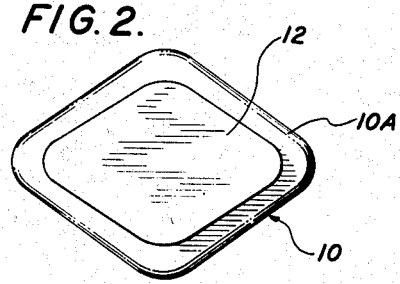
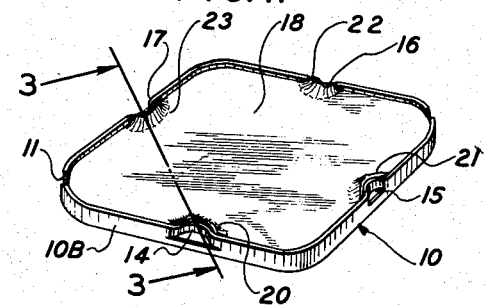
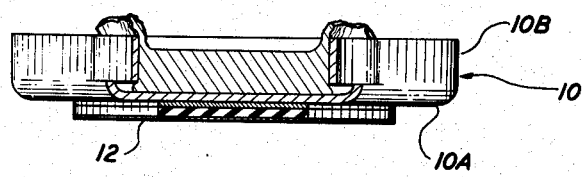
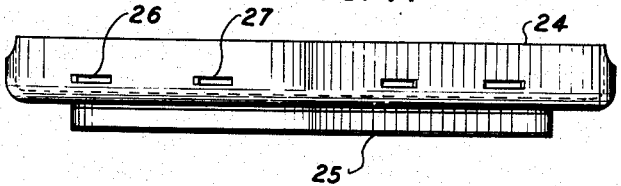
*INVENTOR.*
WALTER M. ANDERSON
BY
*ATTORNEY*

Patented Nov. 18, 1952

2,618,016

UNITED STATES PATENT OFFICE 2,618,016

VULCANIZING PATCH

Walter M. Anderson, Temple City, Calif., assignor to Delano T. Starr, doing business as Gross Manufacturing Company, Monrovia, Calif.

Application April 9, 1949, Serial No. 86,513

4 Claims. (Cl. 18—18)

This invention relates to improvements in so-called vulcanizing patches or hot patches of the type comprising a metal pan, a fuel board disposed in the pan, and a rubber patch adhered to the bottom of the pan. More particularly the invention is directed to improvements which result in greater ease of use and faster vulcanizing action.

The ordinary vulcanizing patch of the type here under consideration comprises a shallow metal pan, a comparatively thin fuel wafer, frequently referred to as fuel board, disposed snugly in the pan with the edge of the board abutting against the side walls of the pan, a rubber patch disposed against the pan bottom and held thereto by the natural tackiness of the rubber. In use, the fuel board is ignited and the heat generated by combustion thereof is conducted through the bottom of the pan to vulcanize the rubber patch onto an inner tube or other receptive article. Many efforts have been made in the past to produce a vulcanizing patch of this type in which the fuel board is easily ignited. These efforts generally center around the use of a fuse or of a dimple, the latter expedient requiring that the surface of the dimple be ruptured to provide an igniting surface.

While burning, the fuel board naturally generates combustion products that are often entrapped between the bottom of the pan and the bottom of the fuel board. The trapped gases tend to separate the board from the pan and thus retard the heat transfer between the burning board and the vulcanizing patch.

The present invention contemplates in a vulcanizing patch comprising a metal pan, a fuel board disposed in the pan, and a rubber patch adhered to the bottom of the pan, the improvement comprising at least one opening in the side wall of the pan to permit escape of combustion products and heated air from beneath the fuel board. In a preferred embodiment of the invention the perforation or perforations in the side walls of the pan are made by slotting the wall and indenting the upper portion thereof. This embodiment is preferred since it has a secondary benefit. Thus, when the fuel board is pressed into the pan constructed in this manner the edge of the board adjacent each of the indented sections of the wall is fractured and pushed upwardly to produce a small rough mound. I have found that it is very simple to ignite the fuel board by putting a match to one or more of these mounds.

The invention will be more clearly understood from the following detailed description thereof taken in conjunction with the accompanying drawing in which:

Fig. 1 is a perspective view of a vulcanizing patch in accordance with the invention;

Fig. 2 is a perspective view of the bottom of the vulcanizing patch of Fig. 1;

Fig. 3 is a sectional elevation taken on the line 3—3 of Fig. 1; and

Fig. 4 is an end elevation of an alternative embodiment of the invention.

Referring to Figs. 1 to 3, the vulcanizing patch of the invention comprises a shallow metal pan 10 which may be of substantially any shape although shown in the drawing in the familiar diamond shape. The pan 10 has a bottom 10A and shallow side walls 10B, the apex of the walls on the major diagonal being notched as at 11 to fit within a conventional press or clamp. The press and the manner of application thereof to the vulcanizing patch forms no part of the present invention. A rubber patch 12 conforming substantially in shape to the pan 10 and being of somewhat smaller area is held on the bottom of the pan. The rubber patch 12 is provided with a naturally tacky surface which is sufficient to adhere the patch to the bottom of the pan and to release it from the pan when the patch is applied as hereinafter described.

In the embodiment shown in the drawings, each of the four walls of the pan 10 is provided with a longitudinal slit lying parallel to the bottom of the pan and slightly above the bottom of the pan. The section of the wall immediately above each of the several slits is indented inwardly as at 14, 15, 16, and 17.

A fuel board 18 conforming substantially to the inside dimensions of the pan 10 is pressed into the pan so that the indented sections 14, 15 etc., of the pan wall fracture the edge of the board raising a small protruding mound of the board at each point of indentation.

In operation, the vulcanizing patch is placed on the article to be patched and is held thereon by a conventional press (not shown). One or more of the raised mounds, 20, 21, etc. are ignited, the flame being quickly propagated throughout the board. The combustion products generated beneath the board are vented through the slots formed by the indentation of the pan wall.

The embodiment shown in Figs. 1 to 3 is preferred since the escaping gases are directed upwardly away from the surface of the article being patched. However, the invention is broader than illustrated in Figs. 1 to 3 and contemplates any type of perforation in the walls of the pan to permit escape of accumulated gases from between the fuel board and the bottom of the pan. As shown in elevation view of Fig. 4, for example, the pan 24 having a rubber patch 25 stuck on the bottom thereof may be perforated as at 26, 27, etc. by cutting slots in the wall and by pushing a section of the wall inwardly. The inwardly extending sections will fracture the board in somewhat the same manner as above described to produce an easily ignited projection. It is apparent that any means of perforating the pan walls will accomplish the purpose of venting the accumulated gases. Perforations which also fracture the board to aid in the ignition thereof are preferred and the means shown in Figs. 1 to 3 has the added advantage of directing the escaping gases away from the article being patched.

Many ways of perforating the side of the pan will occur to those skilled in the art without departing from the scope of the invention.

I claim:

1. A vulcanizing patch comprising a metal pan, at least one indentation in the side wall of the pan, a rubber patch adhered to the bottom of the pan, and a fuel board of substantially the same area and shape as the bottom of the pan disposed therein and having an upwardly protruding mound on its edge circumscribing said indentation.

2. A vulcanizing patch comprising a metal pan having shallow side walls, at least one opening in a side wall of the pan, an indentation in the wall of the pan above each opening, a fuel board disposed in the pan and of substantially the same shape as the inside of the pan.

3. A vulcanizing patch comprising a metal pan, at least one slit in the side of the pan parallel to the bottom of the pan, an indentation in the side of the pan directly above the slit and extending from the slit to the upper edge of the pan, and a fuel board disposed in the pan.

4. A vulcanizing patch comprising a metal pan, at least one opening in the side wall of the pan, an indentation in the side wall directly above the opening, and a fuel board disposed in the pan and of substantially the same area and shape as the bottom of the pan, the fuel board being upset at its edge adjoining said indentation.

WALTER M. ANDERSON.

REFERENCES CITED

The following references are of record in the file of this patent:

UNITED STATES PATENTS

| Number | Name | Date |
|---|---|---|
| 1,252,106 | Hagen | Jan. 1, 1918 |
| 1,257,594 | Fay | Feb. 26, 1918 |
| 1,285,087 | Fay | Nov. 19, 1918 |
| 1,958,803 | Segnitz | May 15, 1934 |
| 2,233,851 | Reibold | Mar. 4, 1941 |
| 2,503,511 | Rowe | Apr. 11, 1950 |